March 28, 1961  J. A. OKEY  2,977,010
BOAT TRAILER AND COLLAPSIBLE SHELTER CONSTRUCTION
Filed Aug. 19, 1959  4 Sheets-Sheet 1
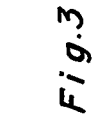
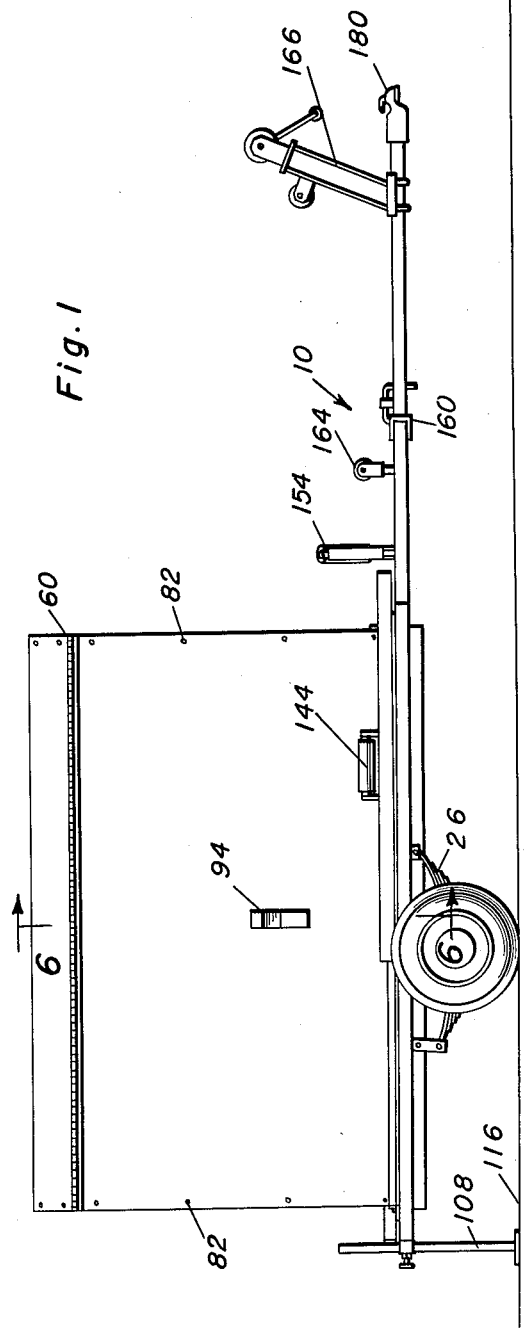
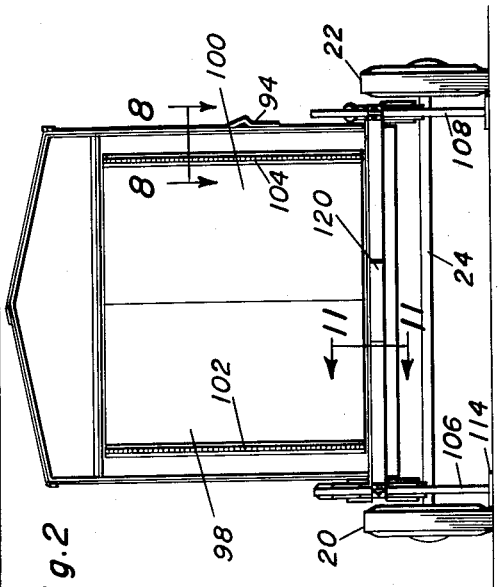
Joseph A. Okey
INVENTOR.
BY *Clarence A. O'Brien*
*and Harvey B. Jacobson*
Attorneys

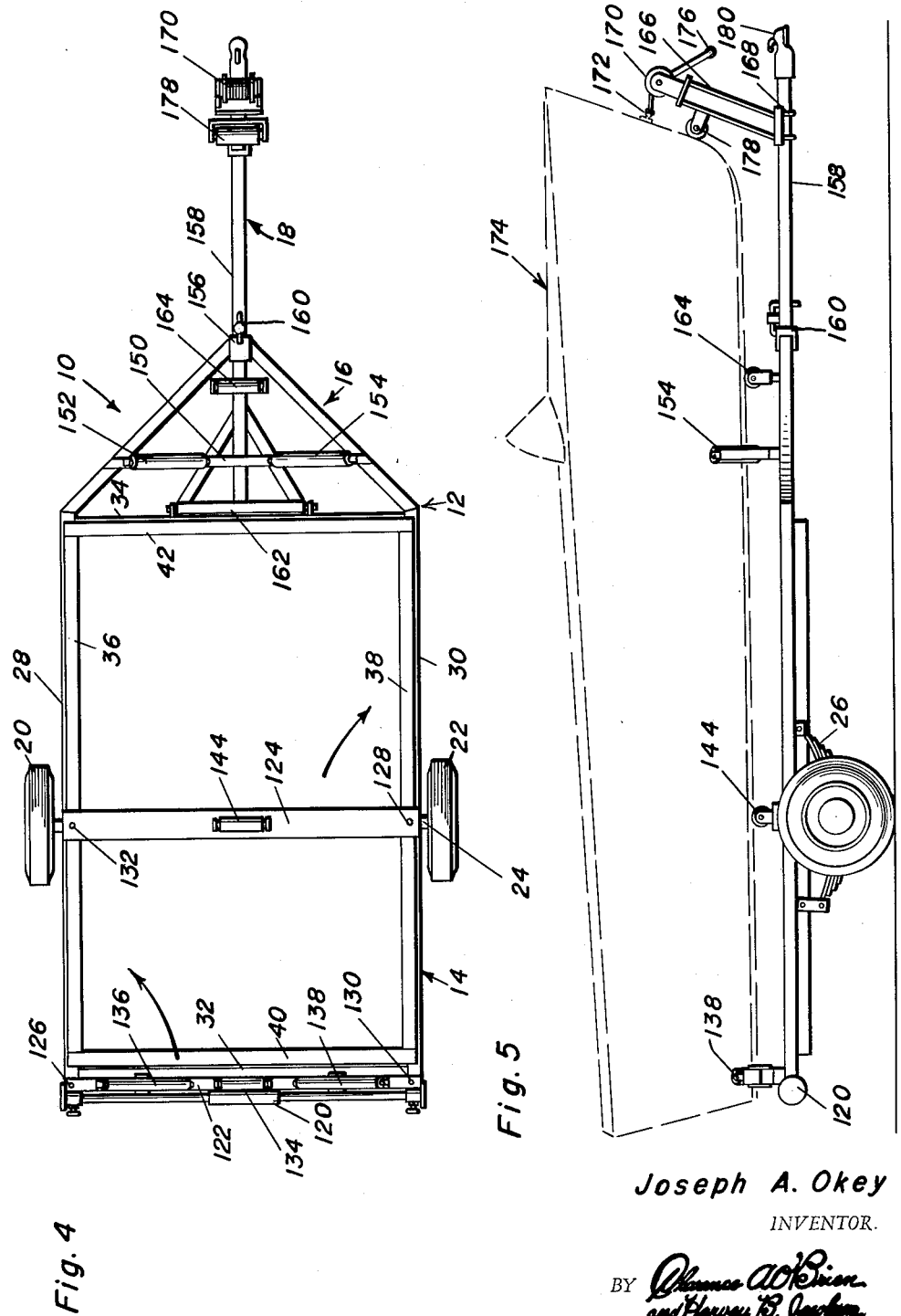

March 28, 1961 J. A. OKEY 2,977,010
BOAT TRAILER AND COLLAPSIBLE SHELTER CONSTRUCTION
Filed Aug. 19, 1959 4 Sheets-Sheet 3

Joseph A. Okey
INVENTOR.

BY *Clarence A. O'Brien*
*and Harvey B. Jacobson*
Attorneys

March 28, 1961 J. A. OKEY 2,977,010
BOAT TRAILER AND COLLAPSIBLE SHELTER CONSTRUCTION
Filed Aug. 19, 1959 4 Sheets-Sheet 4

Joseph A. Okey
INVENTOR.

United States Patent Office 2,977,010
Patented Mar. 28, 1961

2,977,010
BOAT TRAILER AND COLLAPSIBLE SHELTER CONSTRUCTION

Joseph A. Okey, 106 Albright Ave., Graham, N.C.

Filed Aug. 19, 1959, Ser. No. 834,753

7 Claims. (Cl. 214—500)

This invention relates generally to trailer construction and more particularly to a boat carrying trailer which accommodates a collapsible shelter which may be utilized as living quarters or such when the boat is removed from the trailer.

There appears to be a modern day boating trend which requires that boat trailers be utilized to transport boats to and from the water. Accordingly, various types of boat trailers have been recently developed for facilitating the loading of the boat onto the trailer and transporting the combination. Also, it is noteworthy to recognize that along with the boating trend, is an ever increasing popularity of the sport of fishing. It appears that innumerable parties go on week-end fishing trips or such, and while being able to easily transport their boats, they often find it difficult to locate adequate lodging or camping facilities. In view of this, it is the principal object of this invention to provide a novel trailer construction which includes a frame having rollers thereon for easily accommodating a boat, and which is provided with means for converting the construction to a shelter providing temporary living quarters.

It is a further object of this invention to provide a novel trailer construction including a frame supported by depending ground wheels defining a longitudinal axis therebetween. A pair of bars are pivotally secured to the frame and pivotal between a first position extending parallel to the longitudinal axis and a second position extending transverse to the longitudinal axis. The bars have rollers thereon so that when they are in their second pivotal position, a boat may be rolled over the rollers onto the frame and secured thereon. When the bars extend parallel to the longitudinal axis, a well or open area therebeneath is exposed. The well accommodates a collapsible housing therein. The collapsible housing may be erected in place by pivoting some hingedly secured cooperating members.

It is a still further object of this invention to provide a windlass stand and windlass on the tongue portion at the forward end of the frame for pulling a boat over the various rollers carried by the frame and bars. Hitch means are likewise provided on the tongue portion for securing the trailer to a towing vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view illustrating the trailer in its expanded condition for providing temporary living quarters;

Figure 2 is a rear elevational view also illustrating the trailer in expanded condition;

Figure 3 is a rear elevational view illustrating the trailer in collapsed condition with the boat supporting means properly positioned;

Figure 4 is an elevational plan view illustrating the trailer in boat supporting condition;

Figure 5 is an elevational side view illustrating the trailer in boat supporting condition and showing in dotted lines a boat;

Figure 6:
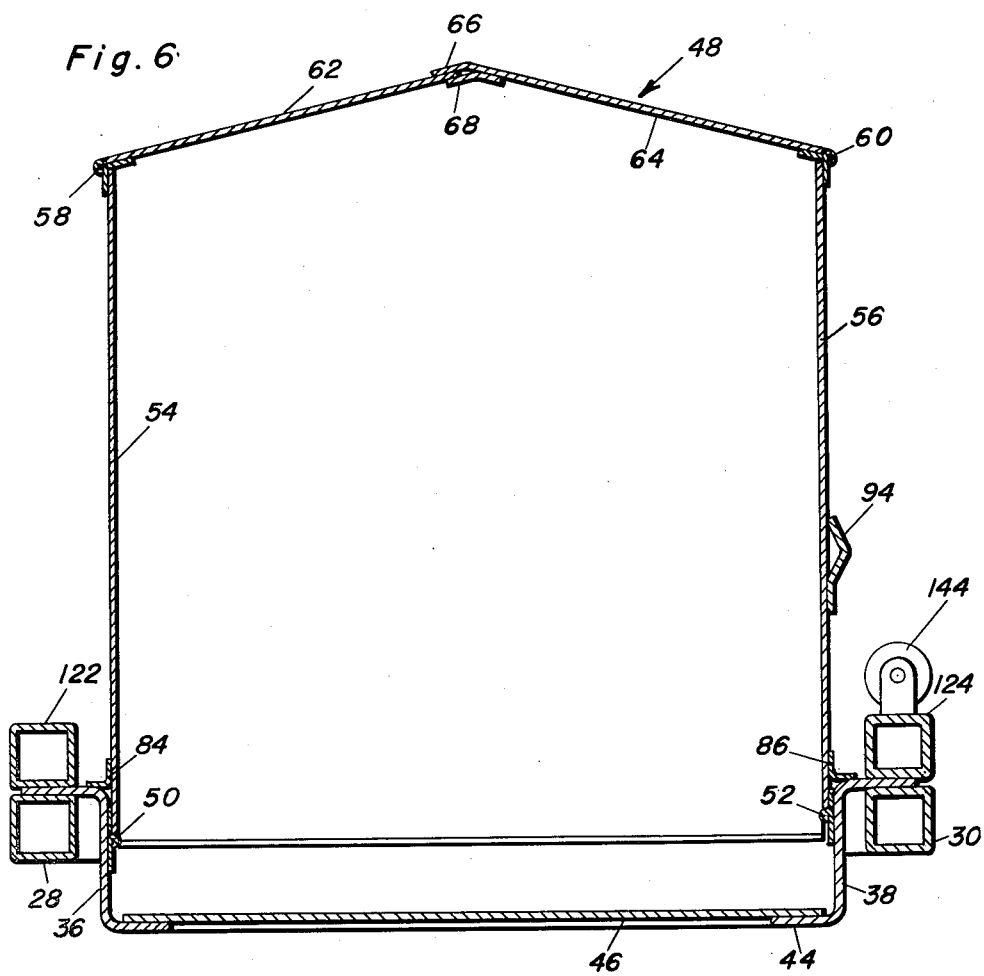
Figure 6 is an enlarged vertical sectional view taken substantially along the plane 6—6 of Figure 1 illustrating the specific structural details of the collapsible shelter in expanded condition.

Referring now to the drawings, the numeral 10 generally represents the trailer construction comprising this invention and including a frame 12 having a rear rectangular portion generally designated as 14, an intermediate forwardly converging portion generally designated as 16, and a forward tongue portion generally designated as 18. The trailer 10 includes a pair of parallel wheels 20 and 22 mounted on opposite ends of an axle 24. Leaf springs as 26 are mounted on the axle 24 and attached to the frame 12. The rear rectangular portion 14 of the frame 12 includes side frame members 28 and 30 bridged by front and rear frame members 32 and 34. It will be noted that the sides, front and rear frame members 28 and 30, 34 and 32 cooperate to form a rectangular area. Z-shaped members are supported on the frame projecting into the rectangular area. Side Z-shaped members 36 and 38 are supported from the side frame members 28 and 30 respectively while front and rear Z-shaped members 42 and 40 are supported from the front and rear frame members 34 and 32. Bottom flanges, as 44, project into the rectangular area below the horizontal plane of the frame. A bottom plate 46 is supported by the flange 44 on the various Z-shaped members.

The respective Z-shape members form a well below the horizontal plane of the frame for accommodating a shelter construction generally designated as 48. With particular reference now to Figures 6 through 14, it will be noted that a hinge axis 50 and a hinge axis 52 are defined extending parallel to the longitudinal axis of the trailer. The hinges 50 and 52 are secured to the Z-shaped members 36 and 38 respectively within the defined well. Hinged at the respective hinge axes are side walls 54 and 56 which in turn have terminally hinged thereto at hinges 58 and 60, cooperating roof elements 62 and 64. It will be noted that roof element 64 is effectively bifurcated at its terminal portion with the parts 66 and 68 defining a slot therein for accommodating an end portion of the roof element 62.

Figure 8:
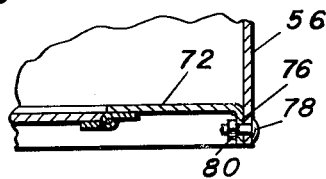
Figure 8 is a fragmentary sectional view taken substantially along the plane 8—8 of Figure 2.
Figure 9:
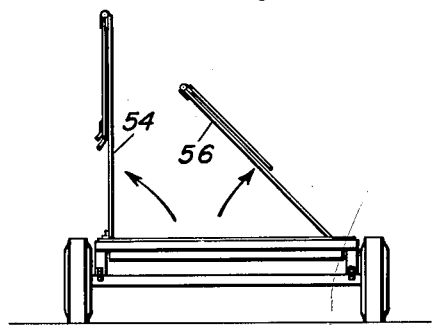
Figure 9 is a representative view illustrating the hinged movement of the shelter side walls.
Figure 10:
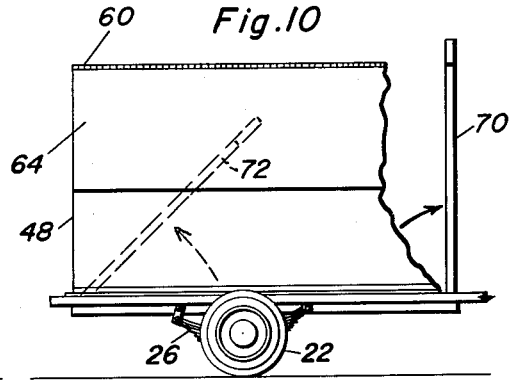
Figure 10 is a representative view illustrating the hinged movement of the shelter front and rear walls.
Figure 11:
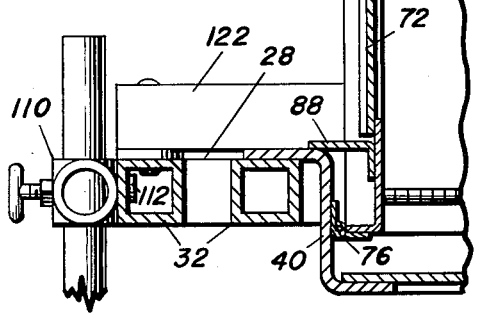
Figure 11 is an enlarged fragmentary sectional view taken substantially along the plane 11—11 of Figure 2 illustrating the rear wall construction.
Figure 12:
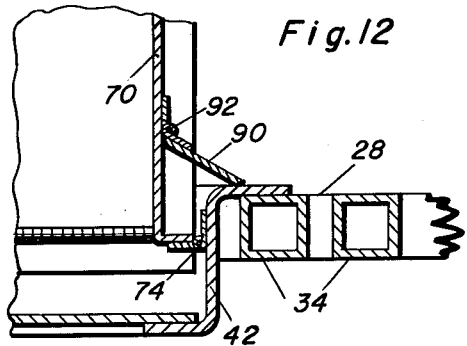
Figure 12 is an enlarged sectional view, similar to Figure 11, however, illustrating the front wall construction.
Figure 13:
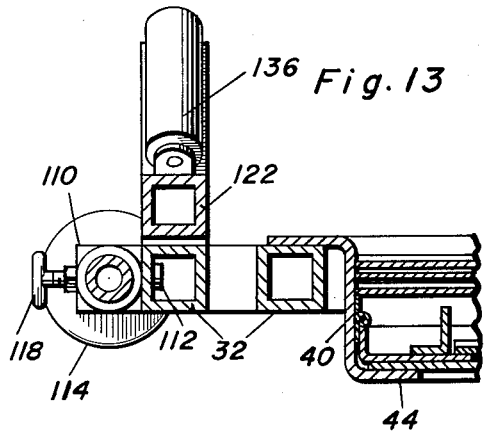
Figure 13 is an enlarged vertical sectional view taken substantially along the plane 13—13 of Figure 3; illustrating the rear portion of the trailer with the shelter in collapsed condition.
Figure 14:
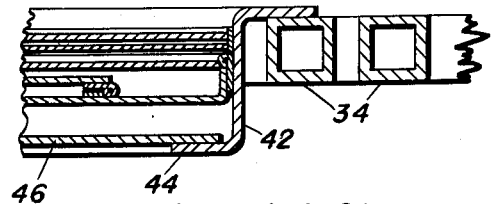
Figure 14 is an enlarged vertical sectional view, similar to the illustration in Figure 13, however, illustrating the front portion of the trailer with the shelter in collapsed condition.

Front and rear shelter walls are designated respectively at 70 and 72 and they are arranged to pivot restrictively about hinge axes 74 and 76 secured to the Z-shaped members 42 and 40 within the well. It will therefore be noted by viewing the illustration of Figures 9 and 10, that the side walls 54 and 56 respectively may be pivoted upwardly as the arrows indicate in Figure 9 while the front and rear walls 70 and 72 respectively may be pivoted upwardly as indicated by the arrows of Figure 10. The cooperating roof elements 62 and 64 of the side walls 54 and 56 will sustain the side walls in the erected position. Referring to Figure 8, it will be noted that the front and rear walls are dished and have a forwardly extending flange 76 which is apertured in alignment with apertures in side wall 56 for receiving a bolt 78 therethrough secured by a nut 80. As is illustrated in Figure 1, and 82 for example a plurality of aligned apertures may secure the front and rear shelter walls to the shelter side walls.

Figure 7:
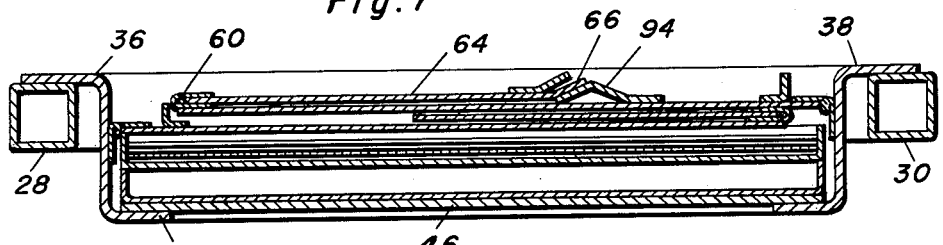
Figure 7 is a vertical sectional view, similar to Figure 6, illustrating the shelter in collapsed condition.

Splash angles 84 and 86 are provided on the side walls 54 and 56 of the shelter to cooperate with the Z-shaped members 36 and 38 as indicated to prevent rainwater from entering the shelter provided. The angle member 88 on the rear wall 72 is contiguous with the Z-shaped member 40 to prevent rain from entering therein while the member 90 is hinged to the front wall at 92 to abut the Z-shaped member 42 to act as a splash plate at that point. Referring to Figure 7, the shelter is illustrated in the collapsed position with the various shelter walls being accommodated in the well formed by the Z-shaped members. A supporting projection 94 is secured to the wall 56 and is adapted to lie under the part 66 of the roof element 64 for supporting the roof element 64 to prevent excessive stress on the hinge 60. It will therefore be appreciated that a shelter construction has been provided in combination with a trailer 10 which is easily collapsible and which may be compactly accommodated within a well defined by Z-shaped members as 36, 38, 40 and 42.

In order to provide access to the shelter, a pair of doors 98 and 100 are hinged in the rear wall 72 and hinges 102 and 104. For the purpose of providing additional support to the trailer construction when it is merely standing, stand means in the form of stands 106 and 108 are provided. The stands extend through sleeves 110, as particularly illustrated in Figures 11 and 13, with the sleeves 110 being rotatable about bolt 112 secured to a portion of the rear frame 32. Each of the stands 106 and 108 includes a large area bottom plate 114 which may bear against and distribute the weight on the ground 116. A T-shaped bolt 118 extends through the sleeve 110 for bearing against the stand, as 106 or 108, which is slidable through the sleeve 110. It will therefore be appreciated that the stands 106 and 108 may be positioned as illustrated particularly in Figures 1 and 2 when the trailer 10 is not being moved. However, when the trailer is being moved, the sleeves 110 may be pivoted 90° about the bolt 112 and the stands 106 and 108 may be slid toward the longitudinal axis of the trailer and received within a central sleeve 120 and locked therein by the T-shaped bolts 118.

In order to convert the trailer 10 from the shelter trailer to a boat trailer, bars 122 and 124 are provided which are respectively pivoted to the frame at 126 and 128. Referring particularly to Figure 4, it will be noted that arrows have been provided for indicating the pivotal movement of the bars 122 and 124 about the pivot points 126 and 128. As is illustrated in the sectional view of Figure 6, the bars 122 and 124 may pivot between a first position wherein they extend parallel to the longitudinal axis of the trailer, or, as indicated in Figure 4, may be pivoted to a second position extending transverse to the longitudinal axis. Pins may be provided at 130 and 132 for locking the free end of the bars 122 and 124 to the frame in the transverse position. The bar 122 has a central roller 134 fixedly mounted thereon and a pair of outwardly inclined rollers 136 and 138 slidably mounted thereon. Slots as 140 and 142 are provided in the bar 122 for slidably accommodating the post supporting the inclined rollers 136 and 138 on either side of the central roller 134. The bar 124 has a roller 144 centrally mounted thereon and in alignment with the roller 134.

The forwardly converging portion 16 of the frame 12 has a cross-bar 150 thereon and outwardly inclined rollers 152 and 154 on either side of the longitudinal axis of the trailer. A sleeve 156 at the converging point of the portion 16 accommodates the tongue 158 of the tongue portion 18. Locking means 160 secure the tongue 158 to the sleeve 156. The tongue portion 18 terminates in a pivot bar 162 utilized to facilitate the mobility of the trailer 10. A roller 164 is aligned with the rollers 134 and 144 and supported on the tongue 158. A windlass stand 166 is slidably fitted on the tongue 158 by collar 168. The windlass stand 166 carries the windlass 170 having a cable 172 adapted to be attached to a boat 174. Also, a handle for manually drawing the cable 172 inwardly is provided and is generally designated as 176. The projection 178 is provided for limiting the forward movement of the boat 170 and spacing it from the windlass stand 166. A hitch mount, generally designated by the ball socket 180 is provided at the extreme forward end of the tongue portion 18 for allowing the trailer 10 to be hitched to a towing vehicle.

From the foregoing, it is thought that the construction and utilization of the trailer comprising this invention should be now well understood. With the bars 122 and 124 positioned transverse to the longitudinal axis of the trailer, the trailer is well suited for utilization as a boat trailer for carrying the boat 154. The windlass 170 is provided to draw the boat 174 over the respective rollers. With the boat removed, the bars 122 and 124 may be pivoted to the position wherein they extend parallel to the longitudinal axis of the trailer. When in that position, the shelter side walls 54 and 56, and shelter front and rear walls 70 and 72 may be raised as indicated in Figures 9 and 10 and secured as indicated in Figure 8 for providing a rain-proof shelter area.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A boat trailer and collapsible shelter construction comprising a frame having a pair of spaced ground wheels defining a longitudinal axis therebetween, at least one bar carrying rollers thereon pivotally connected to said frame and pivotal between a first position extending parallel to said longitudinal axis and a second position extending transverse to said longitudinal axis, said frame defining an enclosed area, Z-shaped structural members supported from said frame and having a lower flange extending into said area about the perimeter thereof, said area being rectangular and being defined by spaced side frame members, said side frame members bridged by front and rear cross frame members, shelter side walls pivoted to said Z-shaped members adjacent said side frame members, shelter front and rear walls pivoted to said Z-shaped members adjacent said front and rear cross frame members.

2. A boat trailer and collapsible shelter construction comprising a frame having a pair of spaced ground wheels defining a longitudinal axis therebetween, at least one bar carrying rollers thereon pivotally connected to said frame and pivotal between a first position extending parallel to said longitudinal axis and a second position extending transverse to said longitudinal axis, said frame defining an enclosed area, Z-shaped structural members supported from said frame and having a lower flange extending into said area about the perimeter thereof, said area being rectangular and being defined by spaced side frame members, said side frame members bridged by front and rear cross frame members, shelter side walls pivoted to said Z-shaped members adjacent said side frame members, shelter front and rear walls pivoted to said Z-shaped members adjacent said front and rear cross frame members, and splash angles secured to each of said shelter walls adapted to abut said Z-shaped members.

3. A boat trailer and collapsible shelter construction comprising a frame having a pair of spaced ground wheels defining a longitudinal axis therebetween, at least one bar carrying rollers thereon pivotally connected to said frame and pivotal between a first position extending parallel to said longitudinal axis and a second position extending transverse to said longitudinal axis, said frame defining an enclosed area, Z-shaped structural members supported from said frame and having a lower flange extending into said area about the perimeter thereof, said area being rectangular and being defined by spaced side frame members, said side frame members bridged by front and rear cross frame members, shelter side walls pivoted to said Z-shaped members adjacent said side frame members, shelter front and rear walls pivoted to said Z-shaped members adjacent said front and rear cross frame members, roof elements hingedly secured to each of said shelter side walls, cooperating joint means carried by said roof elements for providing a secure watertight joint.

4. A boat trailer and collapsible shelter construction comprising a frame having a pair of spaced ground wheels defining a longitudinal axis therebetween, at least one bar carrying rollers thereon pivotally connected to said frame and pivotal between a first position extending parallel to said longitudinal axis and a second position extending transverse to said longitudinal axis, said frame including a rear rectangular portion, an intermediate forwardly converging portion and a forward tongue portion, said rear portion including a rectangular area being defined by spaced side frame members, said side frame members bridged by front and rear cross frame members, Z-shaped structural members supported from said frame and having a lower flange extending into said area about the perimeter thereof, shelter side walls pivoted to said Z-shaped members adjacent said side frame members, shelter front and rear walls pivoted to said Z-shaped members adjacent said front and rear cross frame members.

5. A boat trailer and collapsible shelter construction comprising a frame having a pair of spaced ground wheels defining a longitudinal axis therebetween, at least one bar carrying rollers thereon pivotally connected to said frame and pivotal between a first position extending parallel to said longitudinal axis and a second position extending transverse to said longitudinal axis, said frame including a rear rectangular portion, an intermediate forwardly converging portion and a forward tongue portion, said rear portion including a rectangular area being defined by spaced side frame members, said side frame members bridged by front and rear cross frame members, Z-shaped structural members supported from said frame and having a lower flange extending into said area about the perimeter thereof, shelter side walls pivoted to said Z-shaped members adjacent said side frame members, shelter front and rear walls pivoted to said Z-shaped members adjacent said front and rear cross frame members, supporting legs carried by said rear cross frame member mounted for pivotal movement about an axis parallel to said longitudinal axis.

6. A boat trailer and collapsible shelter construction comprising a frame having a pair of spaced ground wheels defining a longitudinal axis therebetween, at least one bar carrying rollers thereon pivotally connected to said frame and pivotal between a first position extending parallel to said longitudinal axis and a second position extending transverse to said longitudinal axis, said frame including a rear rectangular portion, an intermediate forwardly converging portion and a forward tongue portion, said rear portion including a rectangular area being defined by spaced side frame members, said side frame members bridged by front and rear cross frame members, Z-shaped structural members supported from said frame and having a lower flange extending into said area about the perimeter thereof, shelter side walls pivoted to said Z-shaped members adjacent said side frame members, shelter front and rear walls pivoted to said Z-shaped members adjacent said front and rear cross frame members, supporting legs carried by said frame member mounted for pivotal movement about an axis parallel to said longitudinal axis, and splash angles secured to each of said shelter walls adapted to abut said Z-shaped members.

7. A boat trailer and collapsible shelter construction comprising a frame having a pair of spaced ground wheels defining a longitudinal axis therebetween, at least one bar carrying rollers thereon pivotally connected to said frame and pivotal between a first position extending parallel to said longitudinal axis and a second position extending transverse to said longitudinal axis, said frame including a rear rectangular portion, an intermediate forwardly converging portion and a forward tongue portion, said rear portion including a rectangular area being defined by spaced side frame members, said side frame members bridged by front and rear cross frame members, Z-shaped structural members supported from said frame and having a lower flange extending into said area about the perimeter thereof, shelter side walls pivoted to said Z-shaped members adjacent said side frame members, shelter front and rear walls pivoted to said Z-shaped members adjacent said front and rear cross frame members, supporting legs carried by said frame member mounted for pivotal movement about an axis parallel to said longitudinal axis, and splash angles secured to each of said shelter walls adapted to abut said Z-shaped members, roof elements hingedly secured to each of said shelter side walls, cooperating joint means carried by said roof elements for providing a secure watertight joint.

References Cited in the file of this patent
UNITED STATES PATENTS

| | | |
|---|---|---|
| 2,822,100 | Pesta | Feb. 4, 1958 |
| 2,887,238 | Huber | May 19, 1959 |